J. H. DEAN.
VOTING MACHINE.
APPLICATION FILED MAR. 8, 1899. RENEWED APR. 11, 1907.

982,775.

Patented Jan. 24, 1911.

4 SHEETS—SHEET 1.

Witnesses
H. O. Weaver
Theo L. Jett

Inventor
James H. Dean
By Paul O. Hawkey
His Attorneys

J. H. DEAN.
VOTING MACHINE.
APPLICATION FILED MAR. 8, 1899. RENEWED APR. 11, 1907.
982,775.
Patented Jan. 24, 1911.
4 SHEETS—SHEET 2.
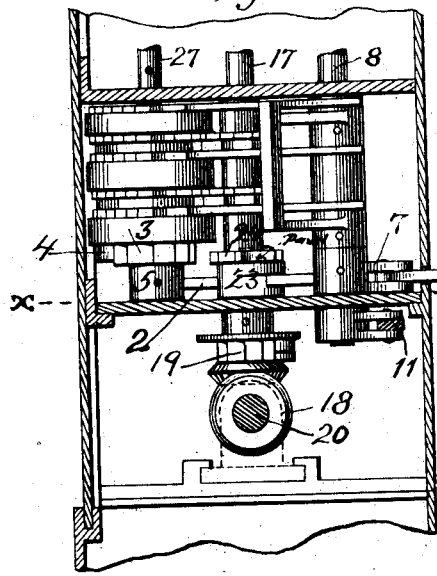
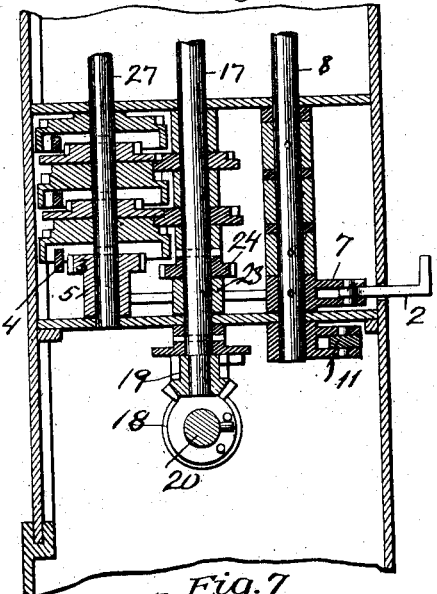
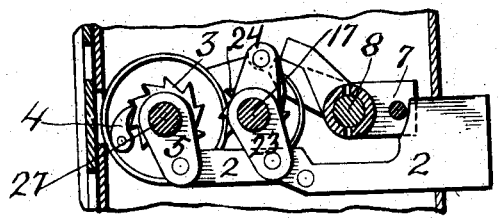
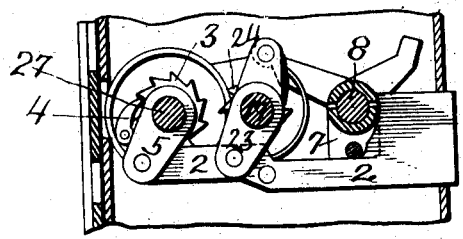
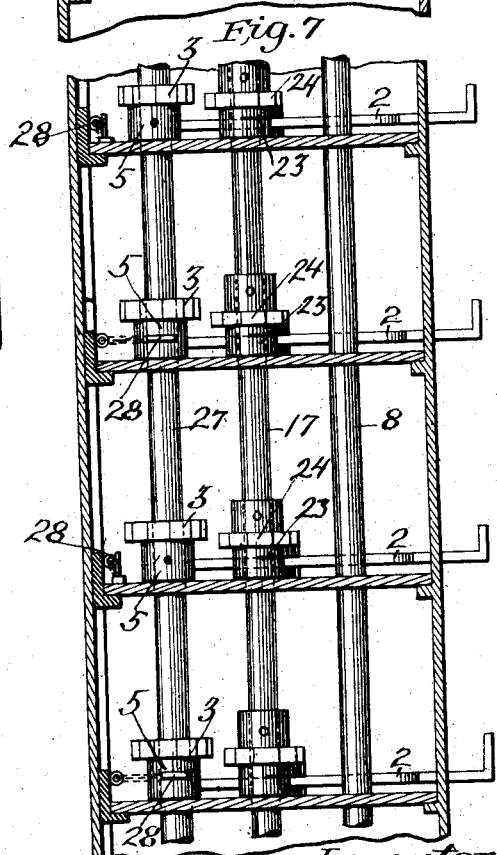
Witnesses
H. O. Wears
Thos. L. Jett
Inventor.
James H. Dean.
By Paul O. Hawley
his Attorneys.

J. H. DEAN.
VOTING MACHINE.
APPLICATION FILED MAR. 8, 1899. RENEWED APR. 11, 1907.
982,775.
Patented Jan. 24, 1911.
4 SHEETS—SHEET 3.
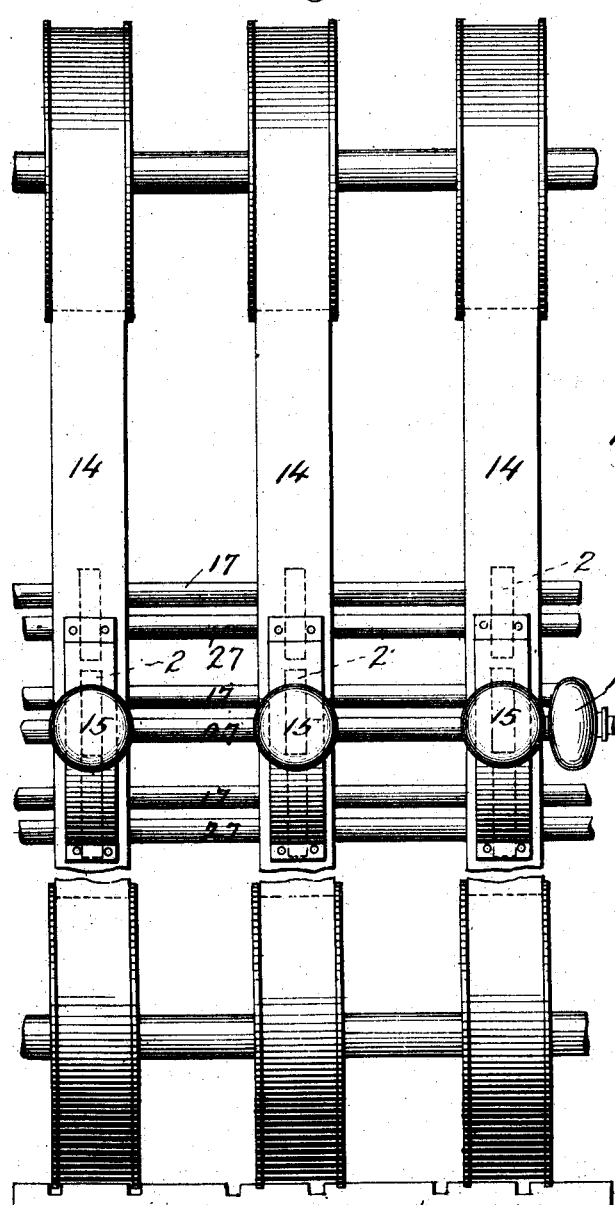
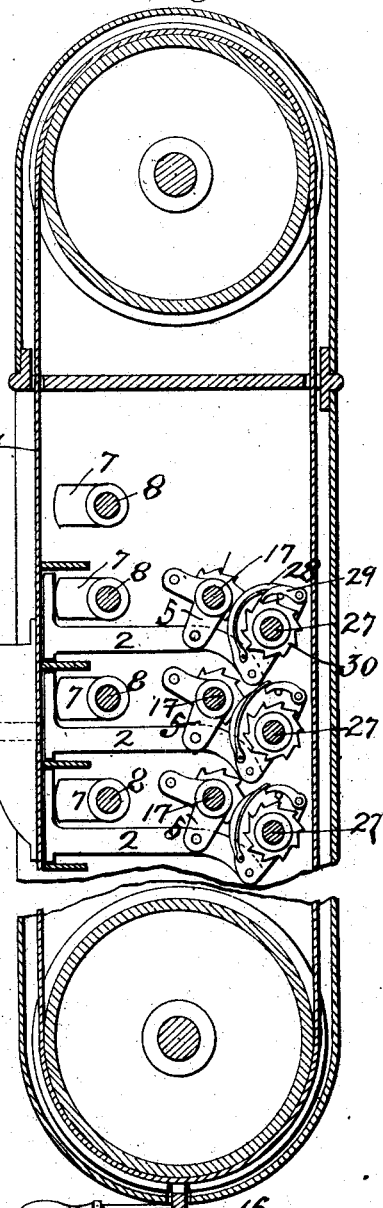
Witnesses.
H. O. Weaver
Thro. L. Jett
Inventor.
James H. Dean.
By Paul O. Hawley
his Attorneys.

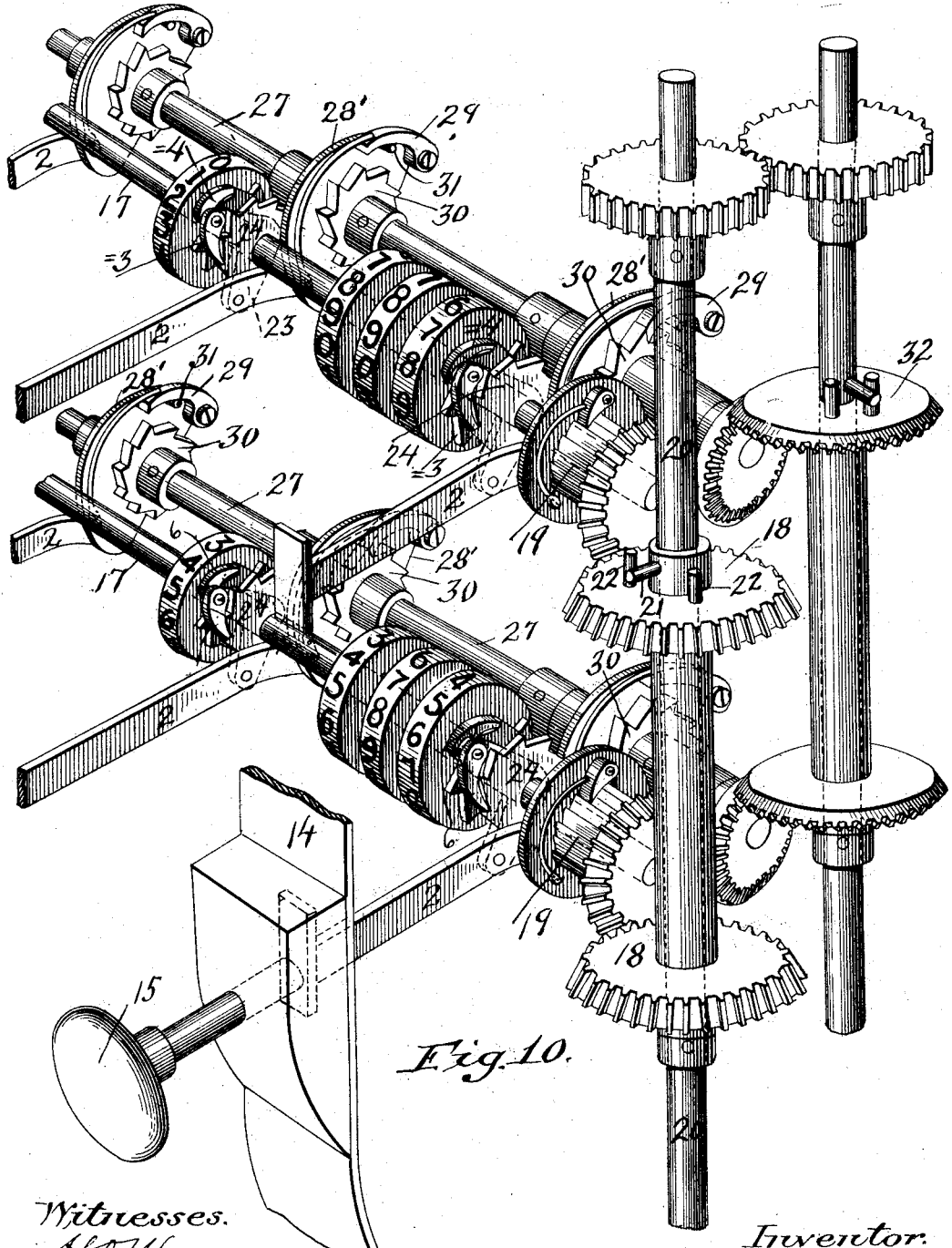

UNITED STATES PATENT OFFICE.

JAMES H. DEAN, OF ST. PAUL, MINNESOTA, ASSIGNOR, BY MESNE ASSIGNMENTS, TO EMPIRE VOTING MACHINE COMPANY, A CORPORATION OF NEW YORK.

VOTING-MACHINE.

982,775.   Specification of Letters Patent.   Patented Jan. 24, 1911.

Original applications filed December 31, 1897, Serial No. 665,108 and Serial No. 665,109. Divided and this application filed March 8, 1899, Serial No. 708,201. Renewed April 11, 1907. Serial No. 367,592.

*To all whom it may concern:*

Be it known that I, JAMES H. DEAN, of St. Paul, Ramsey county, Minnesota, have invented certain new and useful Improvements in Voting-Machines, of which the following is hereby declared to be a full, clear, and exact description.

The present invention relates to the indorsement devices resorted to for controlling the several counters allotted to the same nominee when brought forward by separate parties in multicandidate group.

The general structure of the mechanism somewhat resembles that set forth by my Letters Patent No. 622,192, March 28, 1899, and as to the endless interlocked belt, each with a shiftable indicator to move the selected actuator, by my Letters Patent No. 622,191, March 28, 1899.

The invention will be more readily understood by reference to the accompanying drawings forming a part of this specification, and in which—

Figure 1:
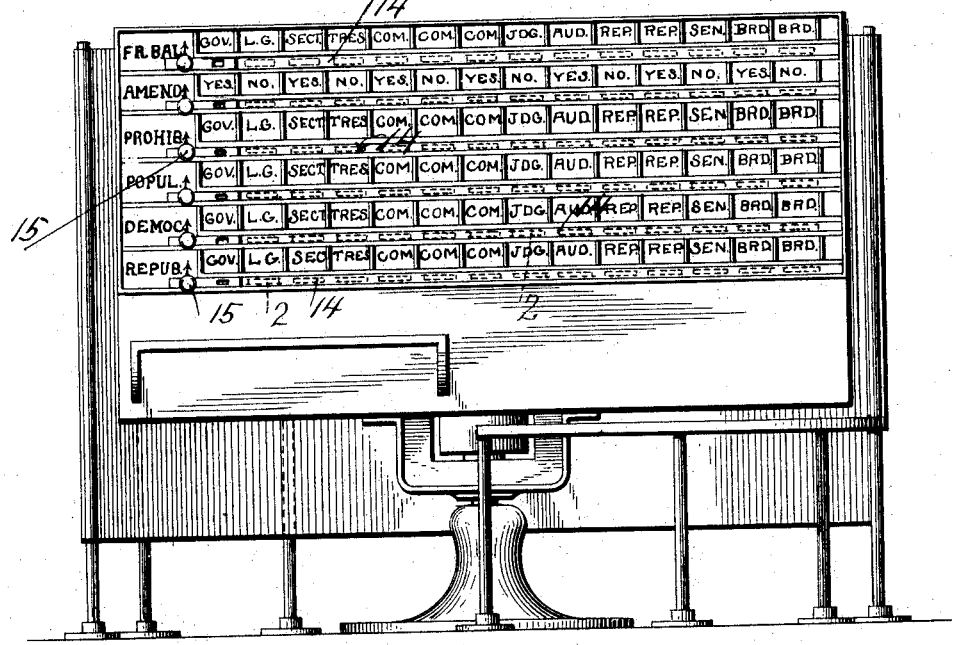
Figure 2:
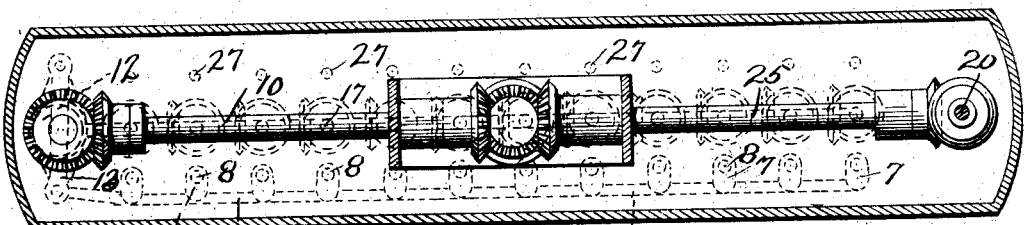

Figure 1 illustrates a voting machine embodying my invention. Fig. 2 is an enlarged horizontal section thereof, illustrating the main driving parts whereby the mechanisms of the machine are operated by turning the whole frame bodily, or, if desired, by the movement of the booth or a booth part. Fig. 3 is an enlarged sectional view showing the complete voting mechanisms. Fig. 4 is a vertical section thereof. Fig. 5 is a sectional view on the line $x\ x$, of Fig. 3. Fig. 6 is a similar view showing the actuator or mechanical ballot in the voted position. Fig. 7 is a vertical section showing the shafts of one row of voting mechanisms in several tiers or tickets. Fig. 8 is a sectional view, which, with Fig. 9, the latter a diagrammatic view, illustrates the interlocked manual actuator belts, and also a modified form of the voting of counter mechanism. Fig. 10 is a diagrammatic perspective view illustrating a modified form of indorsing mechanism or auxiliary limiting mechanism, as applied to the second form of counter.

The counter that I employ comprises the mechanical actuator 2, a ratchet device in two parts 3, 4, and the counter proper, which latter may be of any suitable construction comprised by a train of counting wheels and suitable transfer devices. The actuator 2 is held in any suitable manner in the machine frame and is adapted to be pushed in by the voter to indicate his vote for the candidate which said ballot represents upon the face of keyboard or the machine.

The ratchet devices comprises a carrier 5, that is preferably attached to the actuator 2 by a pivot, said carrier being fixed to a ratchet 3, as shown in Figs. 3 to 7, or, instead, carrying a pawl 6, as shown in Figs. 8 and 10. When the ratchet wheel is arranged upon the carrier to move therewith the pawl (see 4, Fig. 5) may be placed upon the first of the train of wheels that constitute the counter proper, while if the pawl is arranged upon the carrier the ratchet wheel will be placed upon or connected with the unit wheel of the counter, as shown in Fig. 10, either construction permitting the actuator to be pushed in without moving the counter—that is, the voting movement of the actuator simply shifts the ratchet back into position to engage with and turn the counter when said actuator is pushed back to normal. The return of the actuator is accomplished by a restoring device 7 (see Figs. 3, 4, 5 6, and 8) that is adapted to engage and positively move the actuator to its starting or initial position, and thereby move the counter one number through the medium of the ratchet or clutch device. The relative movement between the actuator and the counter may be accomplished in other ways without permitting the direct operation of the counter by the voter through the key.

The counters described are duplicated throughout the machine and are arranged in office rows and the restoring devices 7 are arranged upon shafts 8, of which there is one for each office row. All of these shafts are rocked or moved through a common connection with the main driving member of the machine—that is, operated by the movement of the machine or by the movement of a booth door. As here shown in connection with the movable voting machine (see Figs. 1 and 2), there is a shaft 10 in the lower part of the machine that is connected with the central pivot thereof by suitable gears to be rotated when the machine is turned to admit of the entrance and departure of voters to and from the booth. This shaft 10 operates all of the returning or locking shafts 8 through the bar 11 (see dotted lines, Fig. 2), and the cam 12 and cam lever 13, (see U. S. Patent No. 622192 Fig. 4) which is thrown every time the machine is moved, to first unlock the actuators, and then, as the voter departs from the booth, to return the actuators and operate the counters for which actuators have been set by the voter then departed from the machine.

For controlling the operation or movement of the actuators 2 and limiting the voter to a certain number thereof, but not to certain ones thereof, a limiting mechanism is provided in connection with the actuators. This limiting mechanism may be of any suitable construction. As herein shown, the limiting mechanism may be described as comprising three parts—(1) the means to prevent the casting of more than one vote at a time for any one office; (2) the limiting means proper that prevent the casting of more than a stated number of votes by one voter; and (3) the auxiliary or indorsing means adapted for use or connection with two or more counters that may represent an indorsed candidate.

The first part of the mechanism may comprise the interlocked belts or plates 14 covering the actuators proper 2, and each carrying a manual key 15 which being positioned before the actuators is used to operate the same, one at a time. The belts as indicated in Fig. 1 and in Figs. 9 and 10 extend lengthwise of the political tickets, and to prevent the movement of more than one belt at a time I provide an interlocking bar 16 or equivalent means by which one belt may be freed and the others held stationary, as in Letters Patent No. 622,191, March 28, 1899.

The second part of the limiting mechanism is made up of a shaft 17, one for each office row—that is, one for each row of counters extending transversely of the political tickets; these shafts being connected with limiting devices arranged at the ends thereof and comprising rotary disks 18, each of which is limited to a certain number of steps corresponding to the number of votes that a voter is entitled to cast for candidates for the particular office which each limiting disk represents. The limiting disks 18 preferably take the form of gears that are connected with the respective shafts 17 by beveled gear wheels and one direction ratchet clutches 19. In multi-candidate group the limiting shafts 17 are co-related by connecting the limiting disks or gears belonging thereto (see Fig. 10). The limiting gears or disks 18 are all preferably arranged upon the same stop shaft 20, which shaft is provided with stop pins 21, while said gears 18 have limiting pins 22 which govern the travel of the disks, as said shaft 20 is stationary throughout the voting operation. The limiting shafts 17 are operated by the voter when he pushes in the actuators 2, which latter are connected with said shafts through ratchet devices or clutches comprising swinging pawl carriers 23 and pawls thereon to engage respective ratchet wheels 24 upon said limiting shafts 17. As the voter can push in only one actuator at a time in any one office row and as each movement of an actuator produces a one step movement of the corresponding limiting shaft 17, and as the degree of movement or number of steps permitted said shaft 17 is controlled by the stop pins of the limiting disk, it is evident that after pushing in the given or allowed number of actuators in any office row that the other actuators will be locked out through the engagement of their ratchet wheels with the then immovable and stationary ratchet wheels upon the limiting shaft. These operations occur at the same time with the setting of the counters through the movement or shifting of the ratchets thereof as above described. To clear the machine for the next voter it is only necessary to rotate the shaft 20 which shaft and the limiting disks thereon are permitted forward movement owing to the clutch connections between the same and the shafts 17. This movement occurs immediately after the operation of the returning devices 7 and is accomplished through any suitable connection with the booth door or stationary support of the movable machine, as through the shaft 25 (see Fig. 2) connected by beveled gears to the shaft 20.

The counting wheels may be arranged upon the shafts in the different office rows and the same may be placed either upon the limiting shafts or upon the indorsing shafts 27 (see Figs. 10 and 3, respectively). When the counters are arranged upon the indorsing shafts 27, as shown in Figs. 3 to 7, it is a very simple matter to secure any two or more of the counters ratchet carriers 5 to said shaft 27, instead of allowing the same to rotate freely thereon. These connections may be made by small pins 28, as shown in Fig. 7, and when the same is made it is obvious that when the actuator of one counter thus connected to the indorsing shaft is pushed in the other actuator, connected thereto through its ratchet carrier will be drawn back, thereby preventing its separate operation by a voter and causing but one forward step of the limiting shaft 17; and thus the two or more actuators which represent an indorsed candidate will be caused to operate simultaneously, and in this case upon the reinstatement of the actuators all of the counters, the ratchet devices of which are thus fixed to the shaft 27, will be advanced one number so that all of the counters representing an indorsed candidate will show the same total at the end of the voting period. If it is desired to carry the total upon one counter only, it is only necessary to throw back the pawl of the second counters or the other counters, if there are more than two devoted to the same candidate, so that the operation of the indorsing shaft by either of the actuators devoted to said candidate will be communicated through the shaft to the one counter. It is obvious that the connection thus established between two or more counters in a multi-candidate group will not interfere with the operation of the other counters representing other candidates. It is further obvious that there may be as many indorsements in a multi-candidate group as there are shafts therein or office rows.

A more extended indorsing system may be provided for by increasing the number of shafts 17 for each row or by dividing said shafts into several parts. Where the counters are supported on the limiting shaft, as shown in Figs. 8 and 10, the indorsing shafts are preferably placed back of the same and sustain pawl carriers 28' that are pivoted to the ends of the actuators 2 and bear the pawls 29, which are adapted to engage ratchet wheels 30 held upon the indorsing shaft 27. The pawl carriers are simply journaled upon said shaft, while the ratchet wheels are fastened thereon. Pins or locking devices 31 are provided on the pawl carriers to normally hold the pawls 29 out of engagement with the corresponding ratchet wheels 30, but when an indorsement is to be provided for the pawls 29 of the particular counters that represent the indorsed candidate are dropped into engagement with the ratchet wheels whereby as one ballot actuator is pushed in the shaft 27 will be rotated beneath the pawl connected with the other actuator representing the same candidate, and said shaft 27 being limited to one step movement or partial rotation it will be impossible to push in said other actuator. To limit the movement of the shaft 27, I provide a one step limiting mechanism or disk 32 united with said shaft, the same being similar to the mechanism described in connection with shaft 20.

The association of counting mechanisms in different rows in a multi-candidate group may be provided for by joining the limiting disks of the shafts 27 in the different rows, as indicated in Fig. 10. The same result may be obtained by uniting the shafts 27, shown in Figs. 3 to 7. With the indorsing mechanism illustrated in Figs. 8 to 10 the voter is permitted to operate the actuator belonging to the political ticket which he selects and the count is made upon the counter connected therewith. The operation of one counter belonging to an indorsed candidate does not induce the operation of the other counter, and hence the total vote for the indorsed candidate must be obtained by adding the totals upon the two or more counters, a disadvantage which is offset by the knowledge of how many votes were cast for the indorsed candidate by each of the parties nominating him.

It is obvious that my invention admits of various embodiments and of adaptation to all constructions of voting machines and I do not confine the same to the specific devices herein shown and described.

Having thus described my invention I claim as new and desire to secure by Letters Patent:—

1. In voting machines, the combination with the series of counters and with the limiting devices therefor, arranged in multicandidate group, of the individual actuators to govern the shift of the separate counters and an indorsing shaft common to a plurality of actuators and selectively joined to two or more thereof for simultaneous control of the designated actuators in unison, substantially as described.

2. In a voting machine the combination with a series of voting devices arranged in multi-candidate group, of an indorsing member common to a plurality of said voting devices and movably mounted in the machine independently of said voting devices and means for detachably and selectively connecting two or more of said voting devices for simultaneous operation.

3. In a voting machine, the combination with a number of voting devices, of a number of movable parts mounted in the machine independently of said voting devices and connected to move therewith and a connection between said parts to cause the simultaneous operation of said voting device when one is operated.

4. In a voting machine, the combination with a series of counters arranged in party groups and a series of counter actuators controlled by the voter without operating the counters, of common mechanism for effecting the operation of said actuators upon said counters, and coupling means for selectively connecting two or more of said actuators in different party groups for operation in unison, said coupling means comprising a shaft capable of oscillating and means thereon for connecting the selected actuators thereto.

5. In a voting machine, the combination with a number of voting devices, of a coupling member movably mounted in the machine and means for detachably and selectively connecting two or more of said voting devices to said member for simultaneous operation.

6. In a voting machine, the combination with a series of voting devices, of an indorsing member common to a plurality of said voting devices and selectively joined to two or more thereof for simultaneous operation.

7. In a voting machine, the combination with the series of voting devices, of a member movably mounted in the machine, said member being common to an office row of voting devices, and coupling devices for detachably and selectively connecting two or more of said voting devices to said member for simultaneous operation.

8. In a voting machine, the combination with the counters and the counter actuators set for operation by the voter without operating the counters, of mechanism for simultaneously operating all of the actuators set by the voter to advance the corresponding counters one step and means connecting two or more of said actuators for operation by said mechanism when one is set for operation.

9. In a voting machine, the combination with the series of counters and with the limiting devices therefor arranged in multi-candidate group, of the individual actuators to govern the shift of the separate counters, a coupling member movably mounted in the machine and common to an office row of counter actuators, and separate devices for connecting any two or more of said actuators to said member for simultaneous control of the designated actuators in unison.

10. In a voting machine, the combination with a series of counters arranged in multi-candidate group, of a series of counter actuators, a series of ballot indicators or keys controlling the operation of said actuators, limiting devices interposed between said keys, and an independent limiting mechanism interposed between said actuators to prevent the casting of more than one vote for an indorsed candidate.

11. In a voting machine, the combination with a series of counters and with limiting mechanism therefor arranged in multi-candidate group, of a series of counter actuators, ballot indicating means under the voter's control associated with and governing the operation of said actuators, but incapable of effecting the operation thereof upon said counters, mechanism for simultaneously effecting the operation of all of the actuators indicated by the voter upon the corresponding counters, and coupling devices for selectively connecting two or more of said actuators for operation by said mechanism when one is indicated by the voter.

12. In a voting machine, the combination of a series of counters and a series of counter actuators, ballot indicating devices controlling the operation of said actuators upon said counters but incapable of directly effecting the operation of said counters, a common operating mechanism for effecting the operation of said actuators upon said counters, and means for effecting the operation in unison of two or more of said counters when one is indicated by the voter.

13. In a voting machine, the combination with a series of voting devices, and with interlocking mechanism connected thereto and arranged in multi-candidate group, of an indorsing member common to a plurality of voting devices and selectively connected to two or more thereof for simultaneous operation in unison, said indorsing member and its connections with said voting devices being independent of said interlocking mechanism and the connections thereof with said voting devices.

14. In a voting machine the combination with a series of counters, of a series of ballot indicators controlling, but incapable of directly operating said counters, mechanisms for effecting the simultaneous operation of the indicated counters, limiting devices for preventing the indication of more than a predetermined number of counters and independent limiting means for preventing the casting of more than one vote for an indorsed candidate.

15. In a voting machine, the combination with a series of voting devices and interlocking mechanism therefor arranged in multi-candidate group, of a supplemental interlocking mechanism interposed between two or more of said voting devices for preventing the casting of more than one vote for an indorsed candidate, said supplemental interlocking mechanism being independent in its arrangement and operation of said main interlocking mechanism.

16. In a voting machine, the combination with a series of voting devices, of main interlocking mechanism connected to and interposed between said voting devices for limiting the number of votes which may be cast by a single voter, and supplemental interlocking mechanism interposed between and connected to two or more of said voting devices for preventing the casting of more than one vote for an indorsed candidate, said supplemental interlocking mechanism and its connections with said voting devices being independent of said interlocking mechanism and the connections thereof with said voting devices.

17. In a voting machine, the combination with a series of counters and with limiting devices therefor arranged in multi-candidate group, of a series of counter actuators, ballot indicating means controlling the operation of said actuators, mechanism for effecting the operation of the indicated actuators upon said counters, and an indorsing member common to a plurality of said actuators and selectively joined to two or more thereof to effect the simultaneous operation of the corresponding counters when one of the connected actuators is indicated for operation.

18. In a voting machine, the combination of a series of counters arranged in an office line, actuators for driving said counters, a shaft arranged adjacent to said actuators, said actuators being capable of connection with said shaft so as to be operated thereby, holes in said shaft and pins engaging with said holes for coupling the actuators to said shaft.

In testimony whereof witness my hand this 21st day of February, 1899 at Washington, D. C.

JAMES H. DEAN.

In the presence of—
 ALBERT BERG,
 C. G. HAWLEY.